United States Patent
Gu et al.

(10) Patent No.: US 8,626,798 B2
(45) Date of Patent: Jan. 7, 2014

(54) PROCESSING OF CATEGORIZED PRODUCT INFORMATION

(75) Inventors: Haijie Gu, Hangzhou (CN); Ningjun Su, Hangzhou (CN); Qifeng Dai, Hangzhou (CN); Haiping Ma, Hangzhou (CN); Jinyin Zhang, Hangzhou (CN); Enhong Chen, Hangzhou (CN)

(73) Assignee: Alibaba Group Holding Limited (KY)

( * ) Notice: Subject to any disclaimer, the term of this patent is extended or adjusted under 35 U.S.C. 154(b) by 101 days.

(21) Appl. No.: 13/200,124

(22) Filed: Sep. 19, 2011

(65) Prior Publication Data

US 2012/0072462 A1    Mar. 22, 2012

(30) Foreign Application Priority Data

Sep. 21, 2010   (CN) .......................... 2010 1 0292384

(51) Int. Cl.
    *G06F 17/30*    (2006.01)
(52) U.S. Cl.
    USPC .......................................................... 707/797
(58) Field of Classification Search
    USPC .......................................................... 707/797
    See application file for complete search history.

(56) References Cited

U.S. PATENT DOCUMENTS

| | | | |
|---|---|---|---|
| 5,541,394 A * | 7/1996 | Kouchi et al. ................. | 235/375 |
| 6,128,626 A * | 10/2000 | Beauchesne ............ | 707/999.107 |
| 6,529,898 B1 * | 3/2003 | Fortner et al. ................. | 707/758 |
| 6,625,619 B1 | 9/2003 | McClendon et al. | |
| 7,107,226 B1 * | 9/2006 | Cassidy et al. ......... | 707/999.102 |
| 7,523,114 B2 | 4/2009 | Seamon | |
| 2001/0044758 A1 * | 11/2001 | Talib et al. .................... | 707/200 |
| 2002/0007361 A1 * | 1/2002 | Esaki et al. ....................... | 707/4 |
| 2002/0026386 A1 | 2/2002 | Walden | |
| 2004/0143600 A1 | 7/2004 | Musgrove et al. | |
| 2004/0158496 A1 * | 8/2004 | Tenorio ........................... | 705/26 |
| 2008/0114756 A1 * | 5/2008 | Konig et al. ...................... | 707/5 |
| 2009/0119172 A1 | 5/2009 | Soloff | |
| 2011/0082872 A1 | 4/2011 | Loftus et al. | |
| 2011/0106785 A1 | 5/2011 | Loftus et al. | |

* cited by examiner

*Primary Examiner* — Wilson Lee
*Assistant Examiner* — Tiffany Thuy Bui
(74) *Attorney, Agent, or Firm* — Van Pelt, Yi & James LLP

(57) ABSTRACT

Data processing includes accessing a product category tree, the product category tree comprising a plurality of hierarchical levels. A leaf category level of the plurality of hierarchical levels comprises a leaf category node. The leaf category node includes product information. The product information comprises a plurality of product attribute parameters. The plurality of product attribute parameters comprises standard product information. Data processing further includes selecting, among the plurality of product attribute parameters that correspond to the leaf category node, a representative product attribute parameter that is representative of the product information; and partitioning standard product information of the leaf category node to obtain a plurality of sets using the representative product attribute parameter, wherein each of the plurality of sets includes at least some of the standard product information.

22 Claims, 5 Drawing Sheets

PROCESSING OF CATEGORIZED PRODUCT INFORMATION

CROSS REFERENCE TO OTHER APPLICATIONS

This application claims priority to People's Republic of China Patent Application No. 201010292384.0 entitled AN INFORMATION PROCESSING METHOD AND SYSTEM filed Sep. 21, 2010 which is incorporated herein by reference in its entirety for all purposes.

FIELD OF THE INVENTION

The present disclosure involves the field of computer technology; in particular, it pertains to an information processing method and system.

BACKGROUND OF THE INVENTION

With the continuous development of computer technology and communications technology, more and more users are searching, looking up, and buying products on online shopping websites. Before searching, looking up and buying products, buyer-users are likely to browse the product information posted on websites by seller-users. The seller-users can be corporate entities, manufacturers or individual operators.

The volume of product information submitted by seller-users to the online marketplace website servers can be massive. In order to classify the products represented by the product information received and effectively guide buyer-users to obtain the desired information, website servers usually partition product information using multilevel categories. Multilevel category systems generally have the following characteristics listed below.

First, multilevel category system architecture is relatively stable. Multilevel category systems with relatively stable architecture help seller-users to get accustomed to the system. In such systems, when product information is submitted to website servers, product information is submitted in a standard format and content in accordance with the requirements of the multilevel category system. Such systems also help buyer-users to get accustomed to the system so that the buyer-user can accumulate experience in rapidly searching for desired product information.

Second, multilevel category systems are generally operated and maintained manually by website server operations personnel. With the manual operation method, common knowledge in the field can be regularized to form standards, aiding the extension of the use of the multilevel category system to a variety of websites.

In order to preserve the two characteristics of multilevel category systems described above, when partitioning massive volumes of product information using multilevel categories, product information typically can only be partitioned with a relatively coarse degree of granularity. This is because, due to the wide variety of product information, if product information is partitioned to a finer degree of granularity, then the bottom layer (also referred to as leaf categories) of the multilevel categories must change as product information changes, which is detrimental to the stability of the multilevel category system; moreover, if product information is partitioned to a fine degree of granularity, the resulting multilevel category architecture is bound to be enormous, increasing the difficulty of manual operation of the website servers.

For example, assume the product information under a particular leaf category is "dresses," and the information for a particular dress is of interest. When the product material associated with the product information changes from silk to cotton, the information for the dress will remain under the leaf category for dresses; no change needs to be made to the leaf category. If, however, the granularity of the partitioning of the multilevel category system is finer and the product information under a particular leaf category is "silk dresses," then when the product material of the information for a particular dress changes to cotton, it is necessary to switch the product information from the leaf category for silk dresses to the leaf category for cotton dresses. In other words, the leaf categories change as product information changes. At the same time, because multilevel category systems typically use tree node architecture, each time a subcategory is added, a large volume of categories is added to the multilevel category system, making the architecture of multilevel category systems very large.

Because the granularity of product information partitioning in multilevel category systems is relatively fine, the volume of product information encompassed at even the lowest layer in the multilevel category system can be massive. Under these conditions, when buyer-users search or query product information using multilevel category systems, query time can be long, and query accuracy is lower; moreover, when website servers recommend product information to buyer-users, they are often only able to do so at the leaf category level, resulting in substantial differences in the recommended product information, such that the accuracy of the recommendation does not meet the actual needs of buyer-users.

Additionally, due to the large volume of product information encompassed in leaf categories, the differences in product information included in the same leaf category are also great; therefore, the level of difficulty in realizing operations regarding product information under leaf categories is also higher. For example, website operators may want to identify information for unsafe/counterfeit products using the price parameter. It is generally acknowledged that extremely low prices are very likely to be suspect as counterfeit products. An operator may devise a rule that if the price for a Brand A product is below $100, then the product is likely a counterfeit product, and that if the price is below $20 for another product of the same type but is a Brand B product, the product is likely to be a counterfeit product. If the price of a particular product is $50, it becomes more difficult to directly appraise whether the product is a counterfeit product using the price parameter rule. Additional information for the product would be required to determine its authenticity status. In practice, the large volume of product information under the leaf categories results in an extremely large amount of operations.

BRIEF DESCRIPTION OF THE DRAWINGS

Various embodiments of the invention are disclosed in the following detailed description and the accompanying drawings.

DETAILED DESCRIPTION

Figure 1:
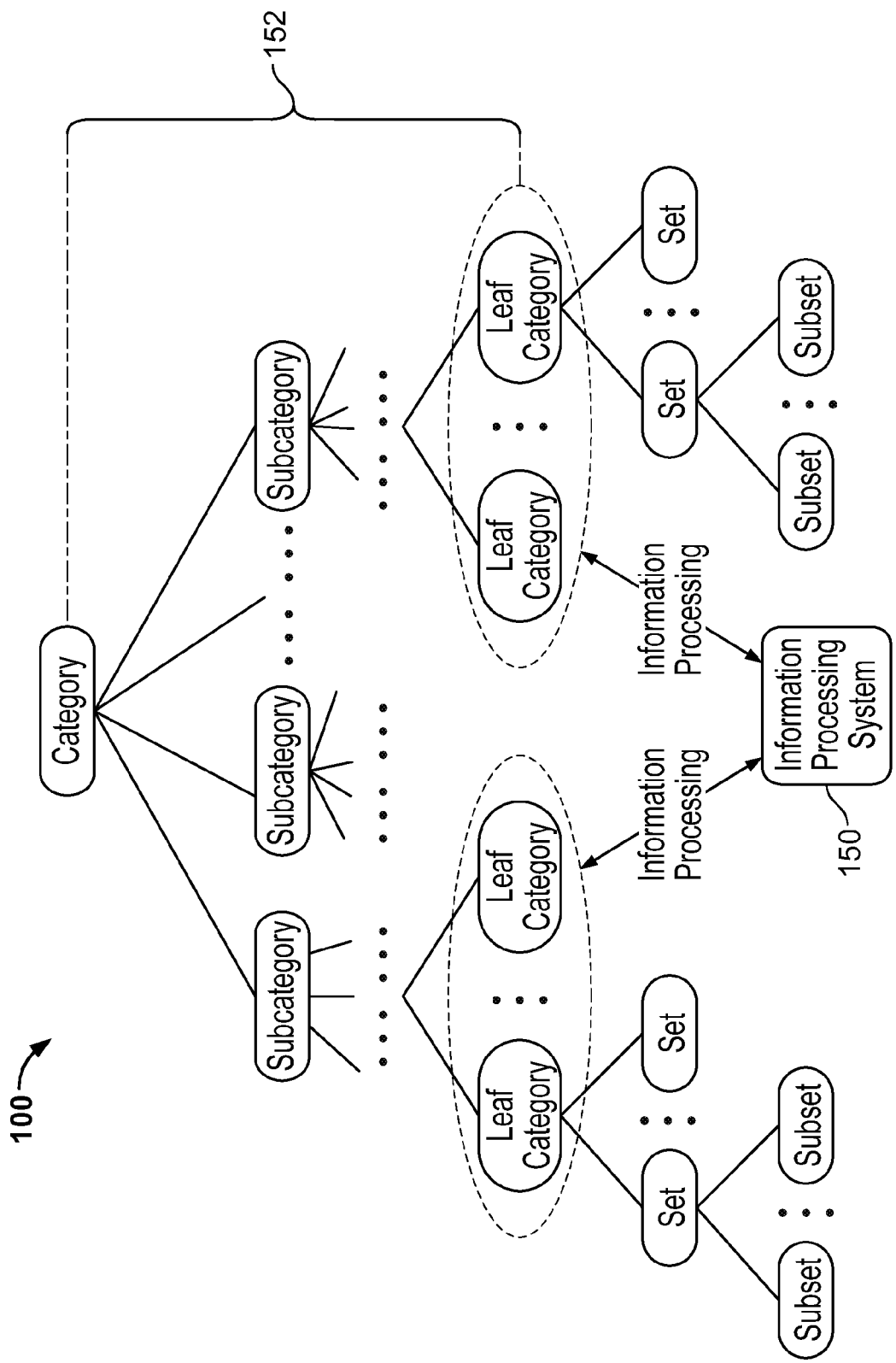
FIG. 1 is a diagram illustrating an embodiment of a multi-level category system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamic partitioning of leaf categories of a multilevel category structure is described. In some embodiments, the leaf categories of a product category tree are processed, where one or more representative product attribute parameters representative of the product information are selected for each leaf category. Each leaf category is partitioned based on the representative product attribute parameters into product information sets that are more granular. In some embodiments, the product information sets are optionally further partitioned into subsets. The sets and/or subsets may be used in product recommendations or user searches. The additional partitioning effectively reduces search and query time, increases the accuracy of searches and queries, and increases the accuracy of the product information recommended to buyer-users by the website server. The amount of calculations for supporting search, query, and product recommendation functions is also reduced. Moreover, the technique can operate on standard multilevel category structures without requiring significant alteration to the original data structure.

FIG. 1 is a diagram illustrating an embodiment of a multilevel category system. In this example, product information is organized in a category tree data structure 100. In some embodiments, category tree structure 100 is stored in a non-transitory storage medium and is accessed by an information processing system 150 to be further processed.

The top portion of the category tree structure 152 is a typical multilevel category structure. Under the root node category of the category tree structure, there is a lower hierarchical level comprising N subcategory nodes (N is an integer). Under each subcategory, there can be an additional hierarchical level of nodes, and so on. The lowest hierarchical level, also referred to as the leaf category level, includes leaf nodes that correspond to leaf categories. This portion of the category tree structure may be generated using existing categorization techniques, including manual categorization, categorization based on an existing schema, etc. Product information in the leaf categories has a relatively coarse degree of granularity, and the multilevel category structure is relatively stable.

Each leaf category under a multilevel category system is a relatively independent and stable category and is not subject to frequent changes. The information processing system processes product information in the leaf categories dynamically to obtain more finely partitioned sets and subsets of product information, organized in one or more layers under the leaf category. Details of the product information and partitioning of sets/subsets are described below. Distributed techniques are used in some embodiments, where each leaf category is treated as a computation node, and distributed and/or parallel processing operations are performed on multiple leaf categories using a group of processors (either within the same computing device or on separate devices) to accelerate the information processing. In FIG. 1, for example, the information processing system is separate from the environment where the multilevel category structure is stored but is able to access the multilevel category structure for further processing.

Each leaf category corresponds to certain product information. For example, if a leaf category is "dresses," then the product information under the leaf category has to do with dresses. Depending on whether the values of the product attribute parameters of product information under a leaf category meet certain established criteria, the information can be partitioned into standard product information that meets the established criteria and non-standard product information that does not meet the established criteria. In some embodiments, the established criteria require the product attribute parameter values to correspond to values that are actually possible. For example, an established criterion may require a price range parameter value to be a positive numerical range. In a leaf category of "dresses," a price range parameter value of product information 1 within a range of $100 to $150 corresponds to an actual available price range and meets the established criteria. The price range is therefore treated as standard product information. In contrast, a price range parameter value in product information 2 of "ABC" does not correspond to a real price range, indicating that an error may have occurred when the seller-user filled in the price parameter numerical value in product 2. Thus, product information 2 is treated as non-standard product information.

In the following example, there are 1000 pieces of standard product information under the leaf category of "dresses." Three representative pieces of the standard product information (standard product information 1, standard product information 2, and standard product information 3) are shown in detail in Table 1. Each piece of standard product information includes four product attribute parameters: the price of the dress, the material of the dress, the brand of the dress, and the model number of the dress.

TABLE 1

| Standard Product Information | Price | Material | Brand | Model Number |
|---|---|---|---|---|
| Standard Product Information 1 | Price Range 1 ($100-$150) | Material 1 (Silk) | A | 1 |
| Standard Product Information 2 | Price Range 1 ($100-$150) | Material 1 (Silk) | B | 2 |
| Standard Product Information 3 | Price Range 2 ($50-$100) | Material 2 (Cotton) | C | 3 |

If all four product attribute parameters in Table 1 were used as partitioning criteria for partitioning information under the leaf category into more granular product information, then the number of sets obtained after partitioning would be large due to the large number of possible combinations of the partitioning criteria. For example, if the 1000 pieces of standard product information under the leaf category are within four different dress price ranges, three types of dress materials, 50 dress brands, and five dress model numbers, then partitioning of the information would yield a maximum of 4×3×50×5=3000 sets. In the course of actual processing, there may be even more types of product attribute parameters. Thus, if all product attribute parameters are used as partitioning criteria, the amount of operations will be comparatively large. Accordingly, as will be described in greater detail below, a portion of the product attribute parameters is selected from among all product attribute parameters to serve as the product attribute parameters determined for the purpose of granular partitioning of product information.

Product information includes product attribute parameters and non-product attribute parameters. As used herein, product attribute parameters refer to fixed information inherent to the product itself, including but not limited to the price of the product, the material of the product, the brand of the product, the model number of the product, the weight of the product, etc. Non-product attribute parameters refer to information pertaining to the product that is defined by the seller-user or the website server and are therefore subject to change. Examples of non-product attribute parameters include the leaf category to which the product information belongs, the posted product heading, seller-user ID, use for the product, etc.

Figure 2A:
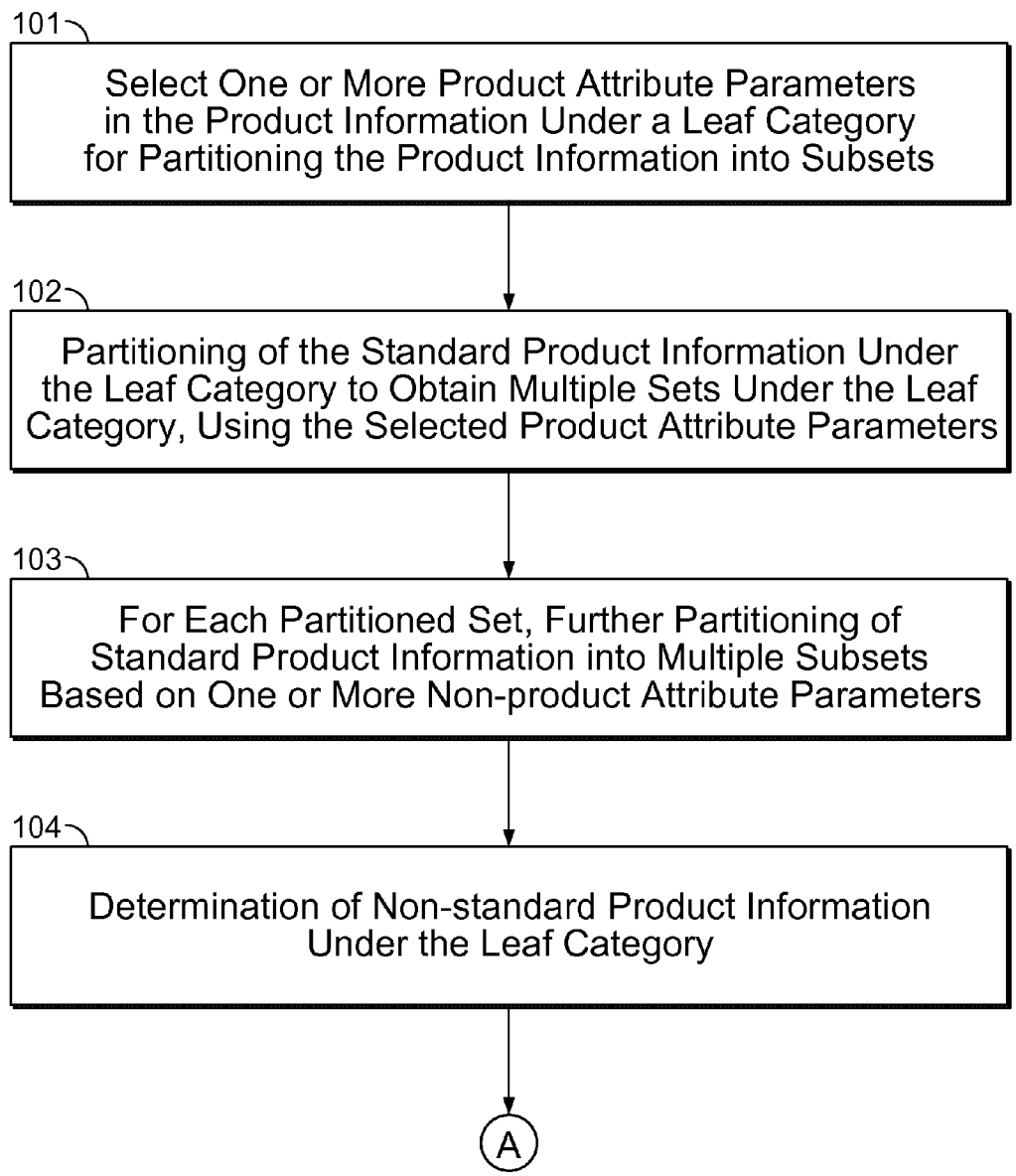
FIGS. 2A-2B are a flowchart illustrating an embodiment of a process for partitioning product information in a leaf category into subsets.
Figure 2B:
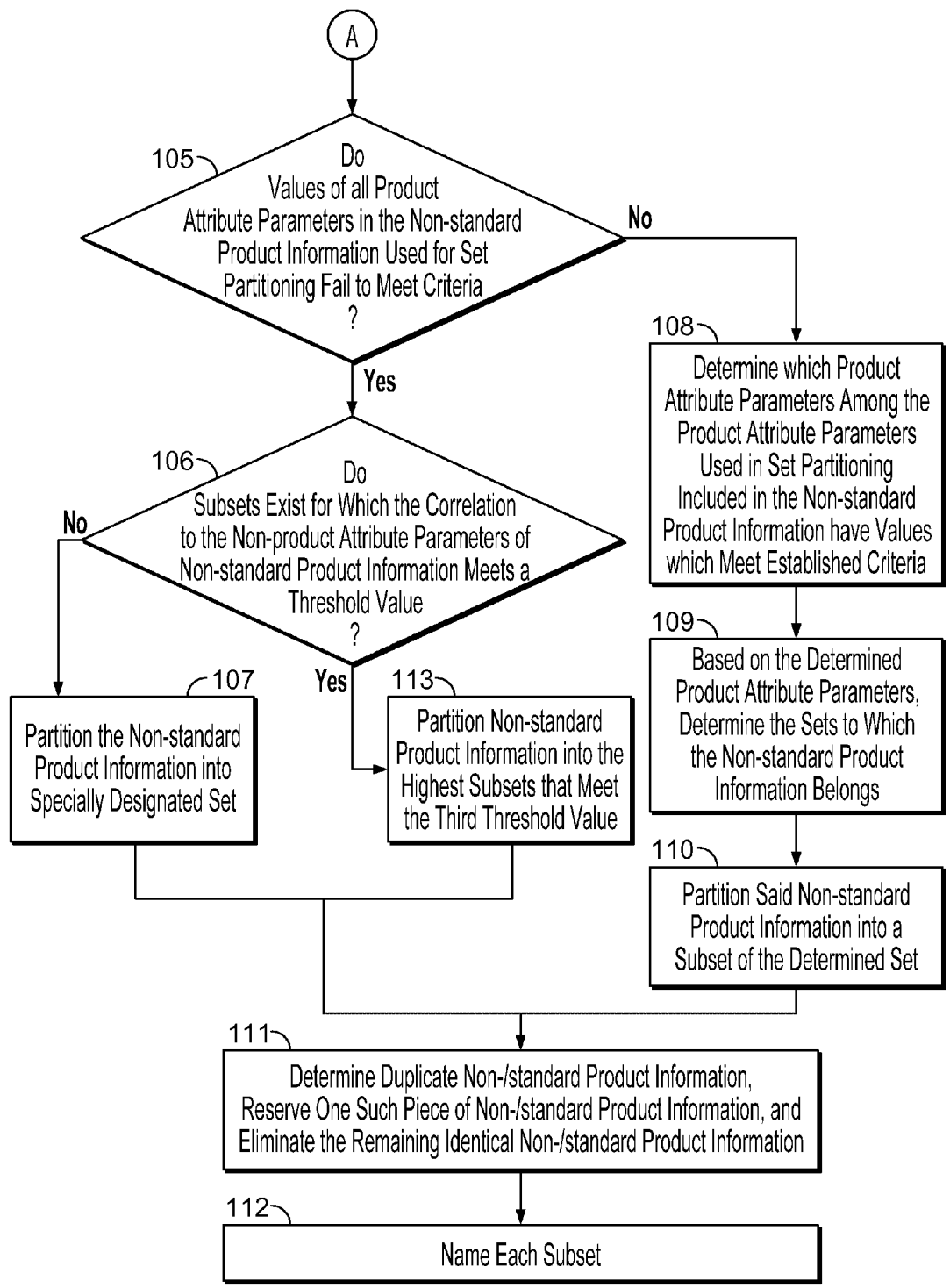

FIGS. 2A-2B are a flowchart illustrating an embodiment of a process for partitioning product information in a leaf category into subsets. Process 100 may be performed on an information processing system 150.

At 101, one or more product attribute parameters in the product information under the leaf category are selected for partitioning the product information under the leaf category into subsets.

In some embodiments, one or more product attribute parameters that are representative of the product information are selected. For example, parameters commonly used by buyer-users in searches and queries are deemed to be representative of the product information, since the resulting sets after partitioning based on the product attribute parameters selected can increase the accuracy of user searches and queries. Furthermore, the values of the selected product attribute parameters should be discrete types (i.e., having a limited possibility of values) in order to minimize the problem of excessive amounts of computations resulting from a large number of possible values during subsequent set partitioning.

In order to satisfy these requirements, in some embodiments, the criteria for selecting product attribute parameters for the partitioning of sets requires: the product attribute parameters are used as search criteria within a period of time in the past, the number of times the product attribute parameters have been used to search product information under the leaf category should reach a first threshold value, and the values of said product attribute parameters should be discrete types.

One or more product attribute parameters are selected according to the criterion described above for use in subsequent set partitioning operations. Using the example of the product attribute parameters for the product information shown in Table 1, if the 1000 pieces of standard product information under the leaf category fall within four price ranges for dresses, three types of dress materials, 50 dress brands, and five dress model numbers, then these values can all be treated as discrete. If buyer-users most frequently use price and material as the search criteria for searches and queries of product information and seldom use the dress brands and model numbers to conduct searches, and the numbers of times the price and material are used as search criteria within a time period reaches a certain threshold, then price and material serve as the product attribute parameters determined in this step for the purpose of set partitioning.

At 102, the standard product information under the leaf category is partitioned to obtain multiple sets of product information using the selected, representative product attribute parameters. In a partitioned set, the values of at least one product attribute parameter included in the standard product information are identical for all the products associated with the set.

Using the example discussed above, if the product attribute parameters used to partition the standard product information into sets are four product price ranges and three types of product material, after partitioning, the following 4×3 combination of 12 sets of product data are obtained:

Set 1: price range 1+material 1; Set 2: price range 1+material 2; Set 3: price range 1+material 3; Set 4: price range 2+material 1; Set 5: price range 2+material 2; Set 6: price range 2+material 3; Set 7: price range 3+material 1; Set 8: price range 3+material 2; Set 9: price range 3+material 3; Set 10: price range 4+material 1; Set 11: price range 4+material 2; and Set 12: price range 4+material 3.

The price ranges and materials included in any two pieces of standard product information belonging to the same partitioned set are identical. Using the product attribute parameters for the standard product information shown in Table 1 as an example, standard product information 1 and standard product information 2 should be partitioned into set 1, and standard product information 3 should be partitioned into set 5.

In 101, during selection of product attribute parameters used to partition granular product information and because full consideration is given to buyer-user search and query habits and discrete typing of product attribute parameter values while unselected product attribute parameters are overlooked, the partitioning results of this step not only correctly reflect the usage habits of buyer-users, but also reduce the amount of operations during partitioning.

Through the use of 101 and 102 discussed above, the product information in leaf categories under multilevel category systems is automatically partitioned to obtain finer grained, partitioned sets of product information, so that when buyer-users perform searches or queries, the granular product sets are searched. It effectively reduces wait time, increases overall accuracy and the accuracy of product information recommended to buyer-users by the website server, and aids in increasing the feasibility of the various operations performed with respect to product information. For example, after the leaf category of dresses is partitioned into twelve sets, searches based on the buyer-user's search criteria can be performed within the corresponding set; because the quantity of product information in each set is significantly smaller than the quantity of product information under the leaf category, the buyer-user's wait time during the search can be greatly reduced, and search and query accuracy is improved. At the same time, when product information is recommended to a buyer-user, product information recommended to the buyer-user that is based on the specific product attributes (e.g., a specified price level and a specific type of material) enables the recommended product information to approximate the actual needs of the buyer-user. Additionally, continuing with the example of using the price parameter to capture information for unsafe products, after granular product information sets are partitioned using the method described above, the corresponding sets can be located quickly based on the prices being surveyed, and queries can then be performed within the sets located to check for the existence of counterfeit products, effectively reducing the amount of calculations associated with the operation, and increasing the effectiveness of execution.

Based on the use of product attribute parameters which best reflect the product information and the values of which are discrete types of product attribute parameters for set partitioning, the accuracy of user searches and queries can be increased further based on the sets obtained after partitioning. Subsequently, the problem of large volumes of operations during set partitioning as the result of excessive possibilities for the values of the product attribute parameters included in the standard product information can be minimized as well.

In some embodiments, optionally at 103, for each partitioned set, the standard product information within the set is further partitioned into multiple subsets according to one or more non-product attribute parameters included in all standard product information within the set.

In some embodiments, the processed product information included in the sets and/or subsets is used for making product recommendations to buyer-users, and/or assisting buyer-user product searches. For example, the product information in the sets and/or subsets can be sent to buyer-users based on the buyer-users' requirements (such as keywords entered by the buyer-users or the observed purchasing habits of the buyer-user). As another example, a search engine can perform keyword searches within the sets and/or subsets, and deliver the results to buyer-users.

Continuing with the example above involving dresses, suppose that standard product information 1 (e.g., price range $100-$150, silk material, brand A, model number 1) and standard product information 2 (e.g., price range $100-$150, silk material, brand B, model number 2) are partitioned into Set 1, and that the non-product attribute parameters of the product information are the product headers posted on the website server by the seller-user. For example, the keywords of the product headers posted within standard product information 1 are "dresses" and "animal prints," and the keywords of the product headers posted within standard product information 2 are "dresses" and "stripes."

In some embodiments, the degree of similarity of non-product attributes of the standard product information within the same set is determined next. Various standard techniques may be used to compute the degree of similarity. For example, a clustering algorithm such as the K-medioids algorithm is used in some embodiments to compute the degree of similarity of the non-product attributes within a set.

Finally, all standard product information within the same set is further partitioned into multiple subsets, such that the degree of similarity between the non-product attribute parameter of pairs of product information within a single subset meets a second threshold value. In some embodiments, techniques such as K-medioids are used to determine the degree of similarity. Since only product information with a degree of similarity meeting the second threshold value is partitioned into the same subset, the degree of similarity of non-product attribute parameters between different subsets is deemed to be relatively low.

The current embodiment is also not limited to the partitioning of subsets using other non-product attribute parameters of the product information, such as partitioning based on uses for the product, etc.

Granular partitioning of standard product information is achieved by use of the proposals in Steps 101 through 103 above; further, non-standard product information can also be partitioned into more granular sets.

At 104, non-standard product information under the leaf category is determined.

Although the values of some or all of the product attribute parameters of non-standard product information do not meet established criteria, if these values are the result of completion errors on the part of the seller-user when submitting information or other human error, the non-standard product information can still express relevant information about a product, and the non-standard product information also has significance for searches, queries, user recommendations, or for use in other operations.

At 105, a determination is made as to whether the values of all the product attribute parameters that are included in the non-standard product information and used for set partitioning fail to meet certain established criteria (e.g., format of the value, range of the value, etc.). If yes, control is transferred to 106; if no, control is transferred to 108.

To determine whether the values of all the product attribute parameters included in non-standard product information and used for set partitioning fail to meet established criteria, in some embodiments, it is determined whether the product attribute parameters selected in 101 for use in set partitioning are parameters which meet established criteria. For example, if in 101, the product attribute parameters selected for use in set partitioning are product price and product material, then in 105, it is determined whether the two product attribute parameters of product price and product material included in the non-standard product information both fail to meet established criteria.

If all of the product attribute parameters of the product information in 101 are used in set partitioning, then as long as there is any product information for which the value of a product attribute parameter fails to meet the established criteria, such information is deemed to be non-standard product information. If, however, only a portion of the product attribute parameters is selected in 101 for use in set partitioning, then only values of the portion of the product attribute parameters that fail to meet the established criteria are deemed to be non-standard product information.

In particular, if there is certain non-standard product information that includes a product attribute parameter whose value fails to meet established criteria, and the non-standard product information is not used in set partitioning, then the non-standard product information may be treated as a special case of standard product information and undergo partitioning in 102. Alternatively, the non-standard product information can also still be treated as non-standard product information, and be subject to partitioning in subsequent steps. For example, if the product attribute parameters used in set partitioning are product price and product material, but the product attribute parameter of product model number fails to meet the established criteria, then the product model number can either be treated as a special case of standard product information and still be partitioned according to 102, or be treated as non-standard product information and be partitioned using subsequent steps described below.

At 106, at least one non-product attribute parameter included in the non-standard product information is determined, and it is determined whether any subsets exist for which the correlation of the non-product attribute parameters to the non-standard product information meets a third threshold value. If yes, the non-standard product information is partitioned into the highest subset with correlation that meets the third threshold value (113), and control is transferred to 111; if no, the process continues to 107.

Because the product attribute parameters of non-standard product information cannot be used in set partitioning, in 106, the non-product attribute parameters of non-standard product information are used to determine to which subset the non-standard product information belongs.

Continuing with the example using product price and product material as the product attribute parameters for set partitioning, and posted product headers as the non-product attribute parameters used in subset partitioning, in 106, if the values for product price and product material of a particular piece of non-standard product information both fail to meet established criteria, the posted product headers (non-product attribute parameters) of the non-standard product information are then determined, and the degree of similarity of the posted product headers to the posted product headers of all standard product information included in each subset is calculated using a clustering algorithm such as the K-medioids algorithm. In order to reduce the amount of operations, similar calculations can be performed with respect to the posted product headers of one piece of standard product information in each subset to identify the subsets in which standard product information that meets the third threshold value resides, and the non-standard product information can be partitioned into subsets in which the standard product information with the highest degree of similarity resides.

At 107, the non-standard product information is partitioned to a specially designated set, and the process proceeds to 111. At 107, due to the existence of values of product attribute parameters that are used in set partitioning of some non-standard information and that do not meet established criteria, and non-product attribute parameters that do not correlate to the subsets in any set, a separate specially designated set is established for this type of non-standard product information. The specially designated set and the sets partitioned in 102 satisfy the principle of dissimilarity between classes.

At 108, product attribute parameters whose values meet established criteria are determined among the product attribute parameters included in non-standard product information. At this point, because the values of some of the product attribute parameters used in set partitioning of non-standard product information meet the established criteria, the portion of product attribute parameters with values that meet the established criteria can be used to partition non-standard product information.

For example, if the product attribute parameters determined in 101 for use in set partitioning are product price and product material, and the value of the product price of a certain piece of non-standard product information does not meet established criteria, but the value of product material does meet established criteria, then the product attribute parameter "product material" can be used to partition non-standard product information.

At 109, the sets to which non-standard product information belongs are determined based on the product attribute parameters determined in 108. At this point, based on the values of the product attribute parameters determined and the values of the product attribute parameters included in the standard product information in each set, the sets with values that are the same as those of the product attribute parameters of the non-standard product information are identified.

The number of sets determined may be greater than one; under such circumstances, the subsequent steps may be executed on all of the determined sets. For example, in the example illustrated in connection with 101, twelve sets were generated. If it is supposed that the product attribute parameter in this step is product material with the value product material 1, then the set to which the determined non-standard product information belongs can be Set 1, Set 4, Set 7, or Set 10.

At 110, based on the non-product attribute parameters of the non-standard product information, the non-standard product information is partitioned into a subset of the set previously determined in 109.

After 109, the sets to which the non-standard product information belongs are determined; however, it has not been determined to which the subsets of which sets the non-standard product information belongs. Thus, 109 further utilizes non-product attribute parameters to perform further partitioning of non-standard product information by partitioning said non-standard product information into the subsets having non-product attribute parameters with the highest degree of similarity.

. When the non-standard product information was partitioned in 106, its degree of similarity to the subset to which it was partitioned needed to meet the third threshold value, whereupon the subset with the highest degree of similarity was selected. In contrast, in 109, it is only necessary to select the subset having the highest degree of similarity from among the sets confirmed in 109. This is because in 105, none of the product attribute parameters of non-standard product information used for set partitioning met the established criteria. Thus, if only the subsets with the highest correlation to the non-product attribute parameters of the non-standard product information were selected without establishing a minimum threshold value (i.e., the third threshold value), then there would be the possibility that the correlations of all non-standard product information to any one subset could be very low, but one subset would still be selected as the subset to which non-standard product information belongs, resulting in low correlation between the non-standard product information and the other standard product information in the same subset. However, at 110 of the process, because the sets determined in 109 were determined using one non-standard product information product attribute parameter with a value that met the established criteria, there is a certain correlation between the sets used for selection in 110 and the non-standard product information, so that the correlation between subsets selected therefrom and the non-standard product information is also relatively high.

There is the possibility of duplicate postings by seller-users of product information on website servers. In order to reduce the resources required for processing duplicate product information, 111 performs deduplication operations with respect to standard product information and non-standard product information. Specifically, at 111, duplicate standard product information is determined, one such piece of standard product information is retained, and the remaining identical standard product information is eliminated. Further, duplicate non-standard product information is determined, one such piece of non-standard product information is retained, and the remaining identical non-standard product information is eliminated.

If the product attribute parameters and the non-product attribute parameters of two pieces of standard product information are identical, then these two pieces of standard product information are defined as duplicate standard product information.

If the product attribute parameters and the non-product attribute parameters of two pieces of non-standard product information are identical, then these two pieces of non-standard product information are defined as duplicate non-standard product information.

The deduplication operation of 111 may be executed prior to 101, or it may be executed at any time during 101-110, or it may be executed after 110.

At 112, each subset is assigned a name or label. 112 may also be executed after 110 and before 111. Upon execution through 110, product information has in fact already been partitioned automatically to obtain standard product units (SPUs), with the units being at the set or subset level. To facilitate re-use of the SPUs, the process assigns a name or label to each SPU, which also signifies the content represented in each SPU.

Specifically, in some embodiments, first, the product attribute parameters and non-product attribute parameters of the standard product information and non-standard product information of each subset are determined. Then, at least one high-frequency word included in said product attribute parameters and non-product attribute parameters is determined. Finally, said high-frequency word is assigned as the name of said subset.

During subsequent buyer-user searches and queries and when recommending product information to buyer-users, the high-frequency words involved in the subset names can serve as keywords for performing searches or recommendations.

Figure 3:
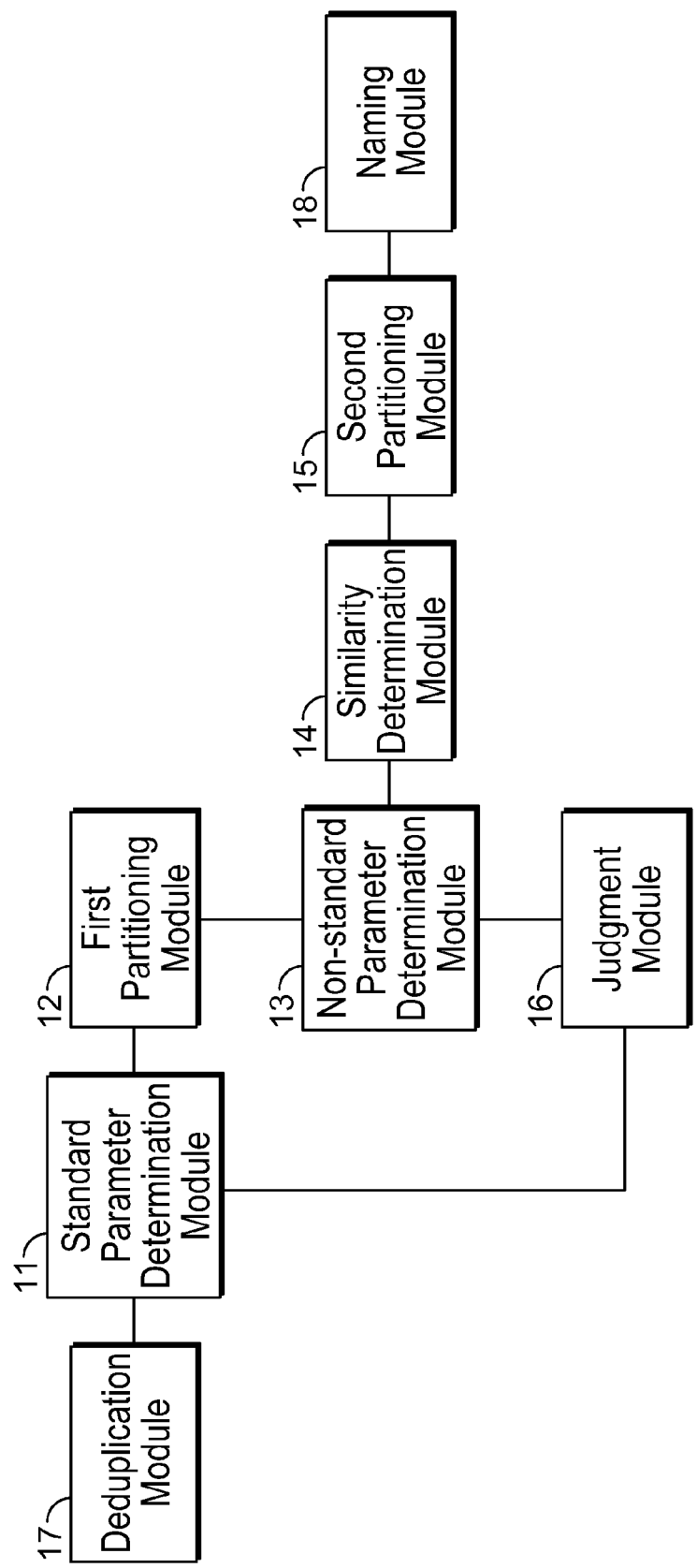
FIG. 3 is a block diagram illustrating an embodiment of an information processing system.

FIG. 3 is a block diagram illustrating an embodiment of an information processing system. In this example, system 300 may be implemented using one or more computing devices such as a personal computer, a server computer, a handheld or portable device, a flat panel device, a multi-processor system, a microprocessor-based system, a set-top box, a programmable consumer electronic device, a network PC, a minicomputer, a large-scale computer, a special purpose device, a distributed computing environment including any of the foregoing systems or devices, or an other hardware/software/firmware combination that includes one or more processors, and memory coupled to the processors and configured to provide the processors with instructions.

System 300 includes standard parameter determination module 11 and first partitioning module 12, wherein: standard parameter determination module 11 is used to determine at least one product attribute parameter included in all standard product information under the leaf category; and first partitioning module 12 is used to partition the standard product information using the at least one product attribute so determined, to obtain multiple sets under the described leaf category, in which the values of the described at least one product attribute parameter included in the standard product information that is partitioned into the same set are identical.

Figure 4:
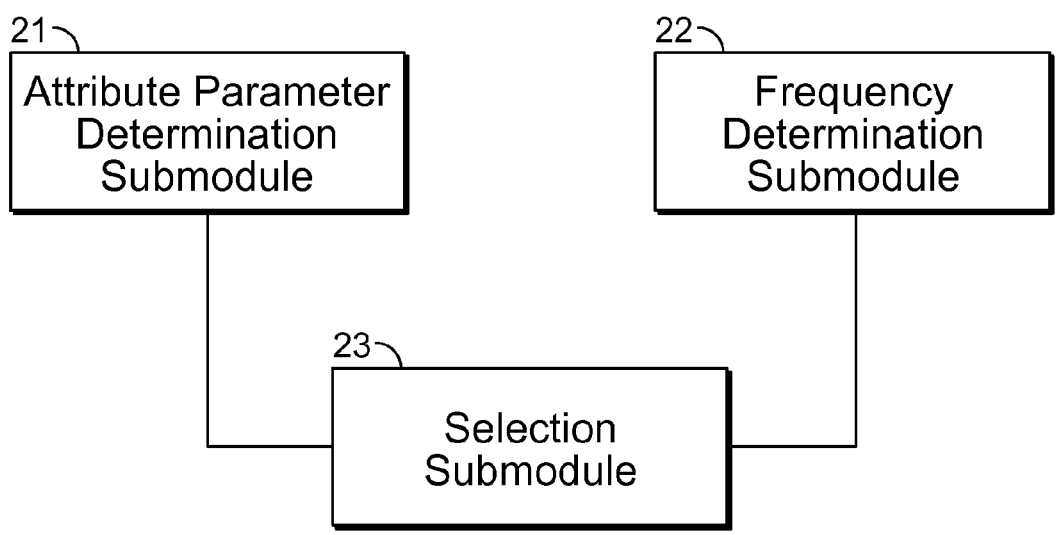
FIG. 4 is a block diagram illustrating an embodiment of the standard parameter determination module.

FIG. 4 is a block diagram illustrating an embodiment of the standard parameter determination module. In this example, the module includes attribute parameter determination submodule 21, frequency determination submodule 22, and selection submodule 23, wherein: attribute parameter determination submodule 21 is used to determine all product attribute parameters included in all standard product information under the leaf category; frequency determination submodule 22 determines the number of times product searches are performed under the described leaf category using each product attribute parameter as the search criteria, within an established period of time; and selection submodule 23 is used to select at least one product attribute parameter from among all of the described product attribute parameters, where the number of times any selected product attribute parameter has been used as the search criterion for product information searches meets the first threshold value and the value of said product attribute parameter is a discrete type.

Returning to FIG. 3, system 300 further includes non-standard parameter determination module 13, similarity determination module 14, and second partitioning module 15, wherein: non-standard parameter determination module 13 is used with respect to each partitioned set obtained to determine at least one non-product attribute parameter included in all standard product information in the sets; similarity determination module 14 is used to determine the degree of similarity of at least one non-product attribute parameter of all standard product information within the same set; and second partitioning module 15 is used to further partition all standard product information within the same set according to degree of similarity, to obtain multiple subsets of said set, in which the degree of similarity of the described at least one non-product attribute parameter between any two pieces of standard product information within the same subset meets the second threshold value.

The described equipment further includes judgment module 16, used to judge whether the values of all product attribute parameters included in the non-standard product information used in set partitioning fail to meet established criteria; if yes, then the non-standard parameter determination module is triggered; otherwise, the standard parameter determination module is triggered, and the value of at least one product attribute parameter used to partition sets in the described non-standard product information meets established criteria.

Based on triggering by judgment module 16, the respective operating processes of non-standard parameter determination module 13 and standard parameter determination module 11 are as listed below.

When the values of all of the product attribute parameters included in non-standard product information that are used in set partitioning fail to meet established criteria:

The described non-standard parameter determination module 13 is further used to determine at least one non-product attribute parameter included in said non-standard product information; the described similarity determination module 14 is used to determine the degree of similarity between the non-product attribute parameters of the non-standard product information and the non-product attribute parameters of the standard product information included in each subset; and the described second partitioning module 15 is further used, based on the non-product attribute parameters, to partition said non-standard product information into a subset, in which the degree of similarity of the non-product attribute parameters of said non-standard product information to the non-product attribute parameters included in the standard product information within the subset to which it is partitioned meets the third threshold value.

In particular, when the values of all product attribute parameters used for partitioning of sets among the non-standard product information fail to meet established criteria, and the degree of similarity of the non-product attribute parameters of said non-standard product information to the non-product attribute parameters included in the standard product information of any subset is lower than the third threshold value, the described first partitioning module 12 is further used to partition said non-standard product information into specially designated sets when the values of all product attribute parameters used for partitioning of sets among the non-standard product information fail to meet established criteria, and the degree of similarity of the non-product attribute parameters of said non-standard product information to the non-product attribute parameters included the standard product information of any subset is lower than a third threshold value.

When the values of not all of the product attribute parameters included in the non-standard product information that are used in set partitioning fail to meet established criteria:

The described standard parameter determination module 11 is further used to determine which product attribute parameters among the product attribute parameters used in set partitioning in the non-standard product information have values that meet established criteria; the described first partitioning module 12 is further used to determine the sets that encompass the described product attribute parameters having values that meet established criteria; and the described second partitioning module 15 is further used, based on the non-product attribute parameters of non-standard product information, to partition said non-standard product information into the subsets within the sets determined by first partitioning module 12, in which the degree of similarity of the non-product attribute parameters of said non-standard product information to the non-product attribute parameters of the standard product information within the subsets into which it is partitioned is highest.

The described equipment further includes deduplication module 17, used to determine duplicate standard product information, retain one such piece of standard product information and eliminate the remaining such standard product information, and to determine duplicate non-standard product information, retain one such piece of non-standard product information and eliminate the remaining such standard product information. All of the product attribute parameters and non-product attribute parameters among the described duplicate standard product information are identical, and all of the product attribute parameters and non-product attribute parameters among the described duplicate non-standard product information are identical.

The described equipment further includes naming module 18, used to determine the product attribute parameters and non-product attribute parameters included in the standard product information and non-standard product information of each subset. At least one high-frequency word included in said product attribute parameters and non-product attribute parameters is determined, and the at least one high-frequency word is used to name said subset.

Use of the method and equipment offered in the embodiments of the present disclosure enables leaf category-based partitioning of granular product information sets using product attributes as the criteria, and further enables the partitioning of subsets of even finer granularity using non-product attributes as the criteria, such that when buyer-users search or query product information, based on granular product information sets, search and query times are effectively reduced, search and query accuracy is increased, and the accuracy of product information recommended to buyer-users by the website server is increased. Additionally, granular product information sets can increase the availability of operations performed with respect to product information, and reduce the volume of calculations when operations are performed with respect to product information. Moreover, the substantive content of the multilevel category system is not altered in the course of set and subset partitioning, in compliance with the features of existing multilevel category systems, and buyer-user search habits are fully considered, partitioning sets utilizing the product attribute parameters commonly used in buyer-user searches. Additionally, corresponding partitioning means are provided for the various situations in which the values of product attribute parameters included in non-standard product information fail to meet established criteria, so that, to the extent possible, all non-standard product information is partitioned into the subsets that have the highest correlation. Finally, the proposal of the present disclosure also performs deduplication of product information and names the partitioned subsets, effectively reducing resource utilization for the processing of duplicate product information, and facilitating subset management by administrators based on subset names, as well as queries of product information within the subsets using the subset names as keywords.

The modules described above can be implemented as software components executing on one or more general purpose processors, as hardware such as programmable logic devices, and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

A person skilled in the art should understand that the embodiments of the present disclosure can be provided as methods, systems or computer software products. Therefore, the present disclosure can take the form of embodiments consisting entirely of hardware, embodiments consisting entirely of software, and embodiments which combine software and hardware. Moreover, the present disclosure can take the form of computer programs implemented on one or more computer-operable storage media (including but not limited to magnetic disk storage devices, CD-ROMs, and optical storage devices) containing computer program codes.

The present disclosure is described with reference to flow charts and/or block diagrams based on methods, equipment (systems) and computer program products. It should be understood that each process and/or block in the flow charts and/or block diagrams, and combinations of processes and/or blocks in the flow charts and/or block diagrams can be achieved through computer program commands. These computer commands can be provided to a general-purpose computer, a specialized computer, an embedded processor, or the processor of other programmable data equipment so as to give rise to a machine with the result that the commands executed through the computer or processor of other programmable data equipment give rise to a device that is used to realize the functions designated by one or more processes in a flow chart and/or one or more blocks in a block diagram.

These computer program commands can also be stored on specially operating computer readable storage devices that can guide computers or other programmable data equipment, with the result that the commands stored on these computer readable devices give rise to products that include command devices. These command devices realize the functions designated in one or more processes in a flow chart and/or one or more blocks in a block diagram.

These computer program commands can also be loaded onto a computer or other programmable data equipment, with the result that a series of operating steps are executed on a computer or other programmable equipment so as to give rise to computer processing. In this way, the commands executed on a computer or other programmable equipment provide steps for realizing the functions designated by one or more processes in a flow chart and/or one or more blocks in a block diagram.

Although preferred embodiments of the present application have already been described, a person skilled in the art can make other modifications or revisions to these embodiments once he grasps the basic creative concept. Therefore, the attached claims are to be interpreted as including the preferred embodiments as well as all modifications and revisions falling within the scope of the present application.

A person skilled in the art can modify and vary the present application without departing from the spirit and scope of the present invention. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A data processing system, comprising:
    one or more processors configured to:
        access a product category tree, the product category tree comprising a plurality of hierarchical levels, wherein:
            a leaf category level of the plurality of hierarchical levels comprises a leaf category node;
            the leaf category node includes product information;
            the product information comprises a plurality of product attribute parameters;
            the plurality of product attribute parameters comprises standard product information and non-standard product information; and
            the standard product information comprises a plurality of non-product attribute parameters;
        select, among the plurality of product attribute parameters that correspond to the leaf category node, a representative product attribute parameter that is representative of the product information;
        partition standard product information of the leaf category node to obtain a plurality of sets using the representative product attribute parameter, wherein each of the plurality of sets includes at least some of the standard product information;
        determine a degree of similarity of non-product attribute parameters;
        partition the standard product information within one of the plurality of sets into a plurality of subsets such that the degree of similarity within each subset meets a threshold value; and
        determine whether values of product attribute parameters that correspond to the non-standard product information and used for set partitioning meet an established criterion; and
    one or more memories coupled to the one or more processors, configured to provide the one or more processors with instructions.

2. The system of claim 1, wherein the representative product attribute parameter was previously used by users to search for products.

3. The system of claim 1, wherein a set in the plurality of sets includes a product attribute parameter with identical value for all products associated with the set.

4. The system of claim 1, wherein the processor is further configured to use the plurality of sets to make a product recommendation.

5. The system of claim 1, wherein the processor is further configured to search the plurality of sets to provide a search result.

6. The system of claim 1, wherein the processor is further configured to use the plurality of subsets to make a product recommendation.

7. The system of claim 1, wherein the processor is further configured to:
    in the event that the values of product attribute parameters that correspond to the non-standard product information and used for set partitioning do not meet the established criterion, determine a subset for which a correlation of the non-product attribute parameters to the non-standard product information meets a third threshold value.

8. The system of claim 7, wherein the processor is further configured to:
    in the event that at least some of the values of product attribute parameters that correspond to the non-standard product information and used for set partitioning meet an established criterion, determine a set to which the non-standard product information belongs based on the at least some of the values of product attribute parameters.

9. The system of claim 8, wherein the processor is further configured to partition the non-standard product information into a subset of the set to which the non-standard product information belongs.

10. The system of claim 9, wherein the processor is further configured to deduplicate standard product information and non-standard product information.

11. A data processing method, comprising:
    accessing a product category tree, the product category tree comprising a plurality of hierarchical levels, wherein:
        a leaf category level of the plurality of hierarchical levels comprises a leaf category node;
        the leaf category node includes product information;
        the product information comprises a plurality of product attribute parameters;
        the plurality of product attribute parameters comprises standard product information and non-standard product information; and
        the standard product information comprises a plurality of non-product attribute parameters;
    selecting, among the plurality of product attribute parameters that correspond to the leaf category node, a representative product attribute parameter that is representative of the product information;
    partitioning standard product information of the leaf category node to obtain a plurality of sets using the representative product attribute parameter, wherein each of the plurality of sets includes at least some of the standard product information;
    determining, using one or more computer processors, a degree of similarity of non-product attribute parameters;
    partitioning the standard product information within one of the plurality of sets into a plurality of subsets such that the degree of similarity within each subset meets a threshold value; and
    determining whether values of product attribute parameters that correspond to the non-standard product information and used for set partitioning meet an established criterion.

12. A computer program product for data processing, the computer program product being embodied in a non-transitory computer readable storage medium and comprising computer instructions for:

accessing a product category tree, the product category tree comprising a plurality of hierarchical levels, wherein:
 a leaf category level of the plurality of hierarchical levels comprises a leaf category node;
 the leaf category node includes product information; the product information comprises a plurality of product attribute parameters; and
 the plurality of product attribute parameters comprises standard product information and non-standard product information; and
 the standard product information comprises a plurality of non-product attribute parameters;
selecting, among the plurality of product attribute parameters that correspond to the leaf category node, a representative product attribute parameter that is representative of the product information;
partitioning standard product information of the leaf category node to obtain a plurality of sets using the representative product attribute parameter, wherein each of the plurality of sets includes at least some of the standard product information;
determining a degree of similarity of non-product attribute parameters;
partitioning the standard product information within one of the plurality of sets into a plurality of subsets such that the degree of similarity within each subset meets a threshold value; and
determining whether values of product attribute parameters that correspond to the non-standard product information and used for set partitioning meet an established criterion.

13. The method of claim 11, wherein the representative product attribute parameter was previously used by users to search for products.

14. The method of claim 11, wherein a set in the plurality of sets includes a product attribute parameter with identical value for all products associated with the set.

15. The method of claim 11, further comprising using the plurality of sets to make a product recommendation.

16. The method of claim 11, further comprising searching the plurality of sets to provide a search result.

17. The method of claim 11, further comprising using the plurality of subsets to make a product recommendation.

18. The computer program product of claim 12, wherein the representative product attribute parameter was previously used by users to search for products.

19. The computer program product of claim 12, wherein a set in the plurality of sets includes a product attribute parameter with identical value for all products associated with the set.

20. The computer program product of claim 12, further comprising computer instructions for using the plurality of sets to make a product recommendation.

21. The computer program product of claim 12, further comprising computer instructions for searching the plurality of sets to provide a search result.

22. The computer program product of claim 12, further comprising computer instructions for using the plurality of subsets to make a product recommendation.

* * * * *